Figure 2:
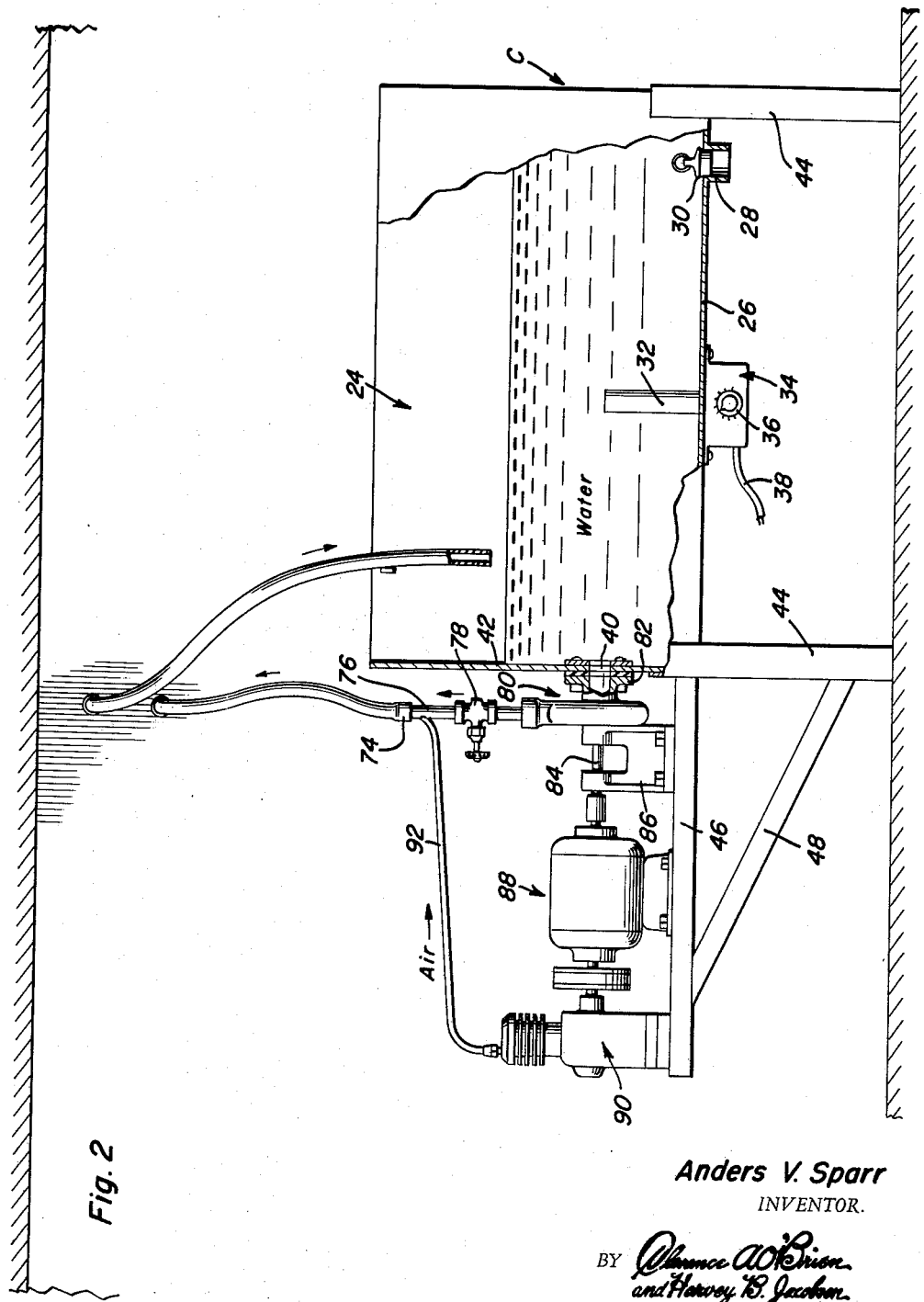

Jan. 7, 1964
A. V. SPARR
3,116,743
MILK PIPELINE WASHING MEANS
Filed Dec. 17, 1962
2 Sheets-Sheet 1
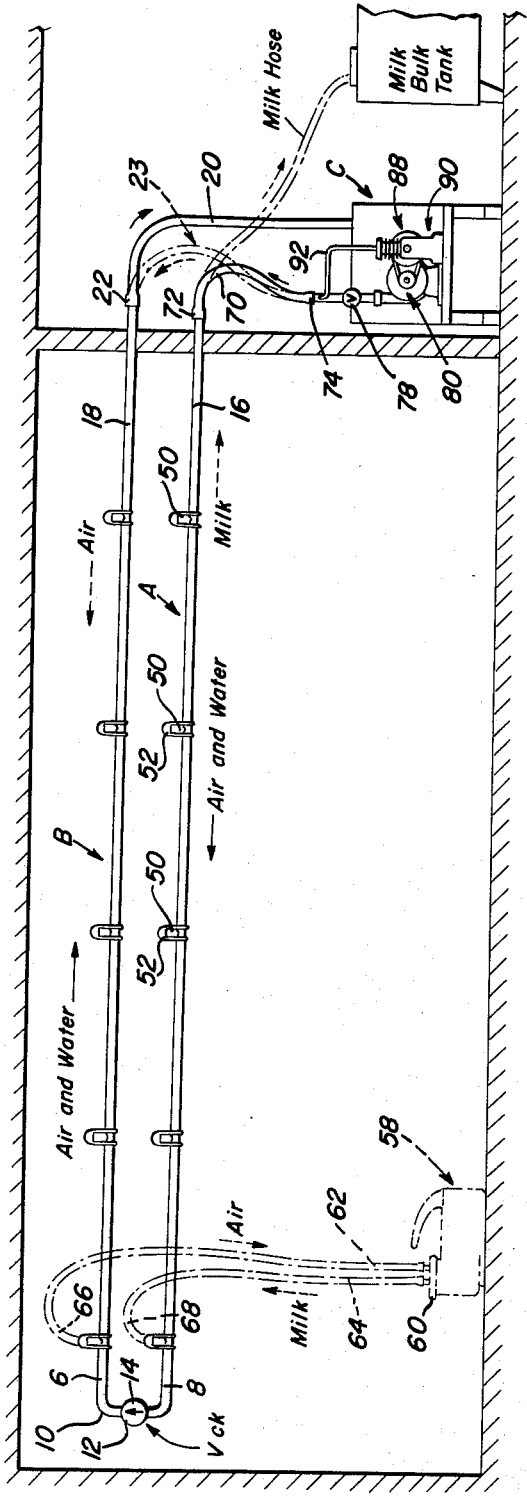
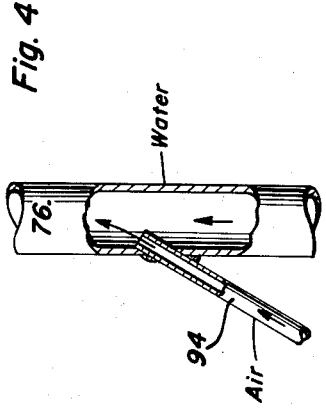
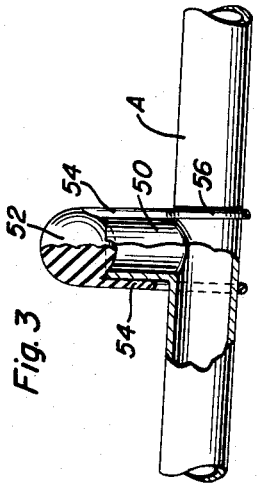
Anders V. Sparr
INVENTOR.
BY *Clarence A. O'Brien*
*and Harvey B. Jacobson*
Attorneys Jan. 7, 1964  A. V. SPARR  3,116,743
MILK PIPELINE WASHING MEANS
Filed Dec. 17, 1962  2 Sheets-Sheet 2

Anders V. Sparr
INVENTOR.

BY

United States Patent Office 3,116,743
Patented Jan. 7, 1964

3,116,743
MILK PIPELINE WASHING MEANS
Anders V. Sparr, Rte. 2, Waupun, Wis.
Filed Dec. 17, 1962, Ser. No. 244,997
8 Claims. (Cl. 134—102)

The present invention relates to a milk pipeline system wherein normally closed communicating pipelines function to convey the milk from conventional pails or buckets to a storing and cooling tank in a milk house and, more particularly, to novel means which is cooperatively associated with like ends of the pipelines for circulating a washing fluid through said pipelines in a manner to effectually clean and wash the same promptly after each milking step has been completed.

With a view toward providing background information it will be helpful for the reader to familiarize himself with the general state of the art to which the invention relates. To this end reference to my prior milk pipeline Patent 3,016,877 should be undertaken. The stated patent comprises, briefly set forth, a system wherein milk is forcibly flushed under pressure from a conventional type milk bucket or pail. The means employed comprises a milk delivery pipeline which is adapted to deliver milk to a storing and cooling tank in the milk house. This pipeline is provided with a normally closed hose accommodating and connecting valve or valves. A second pipeline parallel to the first pipeline is used for delivering compressed air and it, too, is provided with hose accommodating and connecting readily closed valves. Each valve embodies a nipple to which a normally attachable and detachable milk hose is separably connectible. At least one conventional open top milk bucket is involved, said bucket having a readily applicable and removable closure mounted airtight atop the mouth thereof. A pressurized air introducing nipple is carried by the closure and has a hose connected therewith which is in turn detachably connectible with the intended hose accommodating and connecting valve. A milk discharging nipple is also connected with the closure and it in turn is adapted to depend into the bucket and terminates at its milk intake end short of but adjacent to the bottom of the bucket. A bucket emptying milk hose is connected with an upper end of this discharging nipple and is separably connectible with a cooperatively associated nipple on the valve provided therefor in the milk delivery pipeline.

The hose accommodating valves on the two pipelines are standardized and the hoses have free ends which are quickly and separably connectible with their respective valves so that as soon as the stated bucket is emptied and the milk therein has been conveyed or transferred to the cooling tank by way of the milkline, the closure or lid with its nipples and hoses may then be easily moved from the empty bucket and attached to the next succeeding one as fully set forth in prior Patent 3,016,877.

It is one object in the instant presentation to provide feasible and practical means at corresponding or like ends of the two pipelines for pumping fluid (detergent laden flush water) through the pipelines by way of a normally closed valve at the other like ends of said pipelines.

Briefly summarized the means preferably employed to achieve the desired washing and cleansing result comprises a sink or equivalent open top reservoir for the washing and cleansing fluid, a fluid supply hose detachably and communicatively connected with an intake end of one pipeline, a pump communicatively and operatively connected with the sink and an adjacent end of said hose, and a second fluid return and discharge hose separably connectible with the discharge end of the other pipeline and arranged to empty the return fluid into the sink for recirculation through the pump and pipelines.

In carrying out a preferred embodiment of the invention a centrifugal pump is employed. The central intake is communicatively connected with the reservoir of the sink. The discharge side of the pump is connected with a short pipe section having a manually regulatable cut-off valve mounted therein and to which an adjacent end of the cooperative hose is connectible.

Further novelty is predicated on an adaptation and arrangement of component parts wherein, in addition to the centrifugal pump, an air compressor is provided, the pump and air compressor being mounted on a common base and being operated by an intervening electric motor permitting the pump and compressor to operate simultaneously and also permitting the air compressor to be operated independently of the pump when the pump is temporarily off for purposes of feeding air under pressure into the communicating pipeline in a manner to forcibly blow surplus fluid from the lines in order to facilitate carrying out the cycles of washing (with detergent fluid) draining (using air only) and rinsing with clear water.

Further novelty is predicated on the structural means so far revealed wherein the air compressor, when properly and communicatively connected with the air delivery pipeline, functions when the pipelines are set for cooperation during the milking stage in the manner set forth in Patent 3,016,877.

A further objective is to structurally, functionally and in other ways improve upon prior art milk pipeline washing systems wherein means is provided for passing a washing solution under pressure through a pipeline wherein the pipeline constitutes a closed recirculating system and wherein other featured improvements are provided as, for example, in the Merritt Patent 2,800,134 which in addition to having the features briefly stated above is characterized by means for automatically venting the pipeline to the atmosphere after the pressure on the washing solution has been removed with a view toward effectively permitting the solution to drain and thus facilitate the washing and cleaning steps. Whereas, for example, in the Merritt patent no air compressor is provided (only a water pump) the instant invention is characterized by both an air compressor and water pump having a single operating motor therefor and therebetween and particularly wherein the stream of air from the air compressor is employed in a satisfactory manner to effectually agitate the stream of water and to provide a highly turbulent surge in the communicating pipelines.

The present invention also features the ideal timely usage of an air compressor and water pump wherein, and as will be hereinafter noted, the line instead of remaining full after the circulating pump has stopped, is cleared promptly by stopping the circulating pump and leaving the compressor on and utilizing the air stream to forcibly clear the line and with a view toward conditioning the line for the final rinsing and desired air drying steps.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view showing a fragmentary portion of a barn with portions thereof appearing in section and showing the convertible milking and transfer pipeline system and, what is more important, the means which is added thereto and brought into play to achieve the desired flushing, washing and rinsing steps; and FIGURE 2 is a view on a larger scale and with parts in section and elevation wherein the essential component parts of the washing means are shown, partly in section but primarily in elevation;

FIGURE 3 is an enlarged fragmentary view illustrating in section and elevation a portion of one of the aforementioned pipelines and detailing the valved nipple with which the pipeline is provided; and FIGURE 4 is a view on a similar scale, partly in section and partly in elevation, showing the air conduit which is connected at the left in FIG. 2 to a compressor and which is communicatively connected at the right with the pump's hose adapter.

By way of introduction to the description of the details it is to be pointed out that the instant disclosure illustrates (partly in elevation and partly in phantom lines) the essential aspects of the components which go to make up the aforementioned milk system, that is wherein after the milk has been collected in a conventional milk pail or bucket (phantom lines at the left in FIG. 1) it is then put under pressure and forced from the pail into the milk conveying and transferring means, more particularly the "milk" pipeline shown at the bottom in FIG. 1. With reference again to my prior patent it will be evident that, by comparison, there is a similarity in disclosures in respect to the pipelines. However, there will be no intended duplication in the instant proceeding concerning the subject matter already defined in my prior patent. On the other hand it is deemed necessary to "tie in" the instant addition, the washing means, with the prior patented construction to simplify the effort of the reader to grasp the overall picture.

With reference now to FIG. 1 the reference letter A designates the primary or first pipeline while B designates the companion or second pipeline. The circulation through these pipelines varies as indicated by the descriptive legends wherein during the milking procedure the pipeline A is the milk line and the pipeline B the compressed air delivery or conducting line. When the conversion to washing is undertaken the pipeline A picks up and delivers the air and water under pressure and the pipeline B carries the water back for discharge in the sink or reservoir C for recirculation. The end portions 6 and 8 are communicatively connected by a valved connection 10, the valve means 12 being diagrammatically shown and being a one-way valve which opens only in the direction of the arrow 14 when the flushing and washing operation is being undertaken. The righthand end portion 16 of the pipeline A constitutes the intake end for the air and water for washing purposes. The corresponding or like end portion 18 of pipeline B is the discharge or return end to which a suitable length of hose 20 is separably connectible as at 22. The free end of the hose (as shown in FIG. 2) empties into the receptacle portion or reservoir 24 of the sink C. Insofar as the sink is concerned it is a simple conventional type wherein the bottom 26 has a drain 28 with an interior available closing plug 30. The numeral 32 designates a suitable electric heating element operatively connected (not detailed) with a diagrammatically shown water heating device or means 34 provided with an appropriate dial 36 to control a thermostat which functions to maintain the temperature of the washing fluid or water at approximately 140 to 160 degrees. In passing it may be pointed out that where teat cups, strainer and other equipment are washed at the same time the pipe system is being used, such paraphernalia can be placed in the hot detergent laden water in the sink and rinsed with clear water (not detailed) in an obvious manner. Any spraying or other procedure can be taken care of using the sink as a ways and means to do so. The conductor cord in FIG. 2 is denoted at 38. The discharge from the water space is denoted at 40, this being in the wall 42. The supporting legs are denoted at 44 and a shelf at 46 and a suitable brace at 48. Returning now to the pipelines A and B both pipelines are provided with longitudinally spaced selectively used and properly paired nipples or necks 50. Each neck has its free end providing a valve seat for a ball or an equivalent valve 52 which is held in place by diametrically opposite assembling and retaining straps 54 having eyes or the like 56 embracing the portion of the pipe with which they cooperate. These component portions 54 are elastic and the ball valve is normally held closed but is manually openable. These valves can be opened for blowing out the pipelines with pressurized air from the compressor to facilitate the draining step as already suggested. In the milking operation, however, it may be stated here briefly that the numeral 58 designates a milk pail or bucket having the features set forth in prior Patent 3,016,877 wherein a cover or lid 60 has hoses 62 and 64 connected with nipples thereon wherein the upper end of hose 62 is connected at 66 with a nipple in the air pipeline B to receive air under pressure and to deliver it in the direction of the arrow and wherein the upper end of hose 64 is connected as at 68 with the corresponding milk feeding and transferring nipple 50 all as set forth in the prior patent. Inasmuch as the present application relates to the washing aspect of the concept no further particulars concerning the briefly described features of FIGS. 1 and 3 need be given here.

In addition to the pipelines A and B being connected together by a one-way valve 14 as at 10 at the left in FIG. 1 (as distinguished from the prior patent), the utilization of the hoses is to be noted here, that is the hoses at the ends 16 and 18. The discharge or return hose 20 is connected removably at 22 for the washing step when the sink is in use. For the milking step the hose 20 is removed and another hose (which is shown in phantom lines as at 23) is substituted and this particular hose is operatively connectible with the compressor. The other hose shown in full lines is denoted at 70 and has one end 72 separably connectible with the pipeline A. The other end 74 is separably connectible (FIG. 2) with a relatively short pipeline which may be conveniently distinguished as a pipe section 76 which has a hand controlled valve 78 therein and which is operatively connected with the discharge side of the centrifugal pump 80. The intake portion 82 of the pump is communicatively connected with the sink, more specifically the apertured portion of the wall 42 as illustrated. The operating shaft for the pump 84 is mounted in bearings provided therefor on the bracket 86, said shaft being operated from one end of the motor 88 mounted on the aforementioned support shelf 46. To the left of and in axial alignment with the motor is a conventional diagrammatically shown air compressor 90. This air compressor is provided with an air delivery conduit 92 which is connected at the left with the air compressor and connected at the right as at 94 (FIG. 4) with the aforementioned pipe section 76. The connecting point 94 is, of course, above the cut-off valve 78 in order to enable the user to operate the pump 80 and compressor 90 simultaneously and also individually by simply closing the valve 78 and cutting off the operation of the pump 80 and permitting the compressor line, air feed line 92 to continue to operate. When the hose 70 is not being used for washing purposes and the milking system hose 23 is used the hose 23 replaces the hose 70 but the upper end of the hose 23 in this instance is connected with the then intake end portion 18 of the pressurized air delivery pipeline B.

Experience has shown that the invention disclosed utilizes a minimum amount of detergent charged hot water. For example, a 70 foot barn with two lines one and one-half inch in diameter will take about 15 to 20 gallons of wash water, after which a suitable amount of rinse water may be brought into use. As already pointed out in the use of the invention the user stops the water pump 80 and leaves the compressor 90 on. This operation forces the entire amount of water into the communicating line in a matter of seconds. It is particularly important to note that the valve 78 is manually and not automatically controlled. In addition the valves 52 (if one desires to employ these as vents) are also manually operable and by opening these valves 52 and blowing air through the line it is possible to more readily and quickly recondition the pipeline for the subsequently contemplated milking and milk transferring step.

It has also been determined in practice that the pipelines A and B should be in parallelism with each other and hung or suspended in any suitable manner approximately 20 inches or so above the cow. The reason for this location is that in most barns convenient posts are handy to facilitate suspending the pipeline. As already pointed out the valve 14, which is one-way, is closed during the milking procedure or stage of operation but is open by pressure during the washing procedure.

Briefly, the washing procedure involves first putting approximately four gallons of washing water into the tank or sink. Then, the motor 88 is started in order to operate the pump and to pump water into the pipeline A by way of the hose 70 and the intervening open valved pipe section 76. At the same time the compressor delivers air under pressure into the line by means of the feed line 92 and its connection at 94 with the pipe section 76 and the cooperating hose 70. This introduction of air produces a turbulent washing result and causes the air pressured stream of water to surge through the line effectively. Not only is the valve 14 closed during the milking step it has another purpose; namely, to clear the line of water in a few seconds. To do this the valve is closed. It is significant to note that the important step of injecting air under pressure along with the water into the line is to speed up and effectively accomplish the washing procedure.

It is believed that a careful consideration of the specification in conjunction with the views of the drawings will enable the reader to obtain a clear and comprehensive understanding of the subject matter of the invention, the construction of the component parts, the features and advantages and mode of operation. Therefore, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a fluid circulating system comprising a first pipeline provided at longitudinally spaced points with readily accessible valved nipples, a second pipeline proximal and parallel to said first pipeline and cooperating therewith and likewise provided with valved nipples, the valves on nipples on both pipelines being normally closed but selectively openable for venting and also for the attachment thereto of separate milk-pail-attaching hoses carried by readily attachable and detachable individual milk pails, like ends of said pipelines being located adjacent each other and communicatively joined to each other through the medium of a normally closed pressure-opened valve, a fluid return hose having one end separably connected to one end of the second-named pipeline and having a free end portion adapted to be communicatively aligned with a sink adapted to contain detergent-charged washing fluid for said pipelines, a second hose detachably connected at one end with a cooperating end of the first-named pipeline, pump and compressor means comprising a centrifugal pump having an intake proximal to and directly connected with said sink, an air compressor, said air compressor having an air delivery line communicating with said second hose, and a single electric motor aligned with and interposed between the pump and compressor and having operating connection with both the pump and compressor for simultaneously operating said pump and compressor.

2. The structure defined in claim 1 and wherein said pump is provided on a discharge side thereof with a rigid relatively short auxiliary pipe section provided with a manually regulatable valve, the adjacent end of the second-named hose being separably connectible with said auxiliary pipe section.

3. For use in conjunction with a pair of spaced parallel pipelines commensurate in length and having accessible manually openable and closable valved nipples, corresponding ends of said pipelines being permanently joined by a normally closed pressure responsive and openable valved connection and opposite corresponding ends thereof being open and in proximity to each other; flushing and washing means for said pipelines and nipples comprising: a sink for wash water, a first hose having one end communicatively joined to the water return discharge end of one of said pipelines with its other end free and communicatively cooperable with said sink, a centrifugal pump operatively connected with said sink, a second hose having one end communicatively connected with the water intake end of the other pipeline, and a rigid valved connection between said pump and the cooperating end of said second hose, an air compressor, a communicating and operating connection between said air compressor and said rigid valved connection, a prime mover interposed between and in alignment with and having power operated shafts axially aligned and having simultaneous operating connection with the pump and compressors respectively, and a common fixed support for said pump, compressor and motor.

4. A milk pipeline washing system comprising a pipeline having spaced parallel portions with like ends thereof communicatively connected by a one-way pressure opened valve, means including a pump for circulating fluid under pressure through said pipeline, means for simultaneously injecting air under pressure into the pipeline for use in conjunction with the pressurized washing fluid, and manually openable and closable valve means embodied in said pipeline designed and adapted to be opened to the atmosphere when the pump is off and when the pressurized air is being circulated through said pipeline and, in combination, a sink, a return water hose cooperable with the sink at one end and connectible with a discharge end of the pipeline at the other end, a second hose connectible at one end with the other end of said pipeline, a centrifugal pump provided with a valved pipe section to which an adjacent end of the second-named hose is connected, said pump being communicatively connected with said sink, a support for the pump, and a motor on said support operating the pump.

5. The structure defined in claim 4 and in combination, an air compressor on said support operatively connected with said motor, said air compressor being provided with an airfeeding line joined at one end to the compressor and at the opposite end to said valved pipe section.

6. In a permanent-type system wherein fresh warm milk which has been collected in a conventional milk pail or bucket is put under pressure is forced from the pail and into milk transferring pipeline means, in combination, a first pipeline having at least one valved milk inlet nipple, a second pipeline complemental to said first pipeline and adjacent said first pipeline, like ends of said pipelines being communicatively joined to each other by way of a valved connection, a stationary sink adapted to contain a predetermined amount of flushing and washing fluid for sanitizing both of said pipelines, a fluid return hose having one end separably but communicatively connectible to a discharge end of said second-named pipeline and having the other end free and communicatively cooperable with and for returning used fluid to said sink, a centrifugal-type fluid pressurizing and circulating pump adjacent to and having an axial intake directly and communicatively joined with said sink, a valved pipe section communicatively joined at one end with the outlet of said pump and joined at its other end with an adjacent cooperating end of the first-named pipeline, and power means operatively connected with and for operating said pump, and an air compressor having an air delivery line communicatively and operatively connected with the vlaved pipe section connecting the pump and said first-named pipeline.

7. The structure defined in claim 6, and wherein said pump and air compressor are mounted on a common foundation and said source of power comprises an electric motor, said motor being interposed operatively between the pump and compressor, respectively, and having simultaneous operating connection at its respective ends with the pump on the one hand and the compressor on the other hand.

8. For use in conjunction with a milk delivery system characterized by a milk delivery pipeline which is designed and adapted to deliver milk to a storing and cooling tank in a milk house and wherein the pipeline is provided with normally closed manually controllable hose-accommodating and connecting valved nipples, and wherein like ends of the pipe portions of the pipeline are communicatively joined by a valved connection and other like ends are open and adjacent each other; means for washing and drying the overall pipeline including the valved nipples, said means comprising: a stationary sink for the wash water, said sink provided with an outlet on one side, a supporting shelf projecting from and attached to said sink adjacent said outlet, a centrifugal pump having its central intake portions connected to said one side and communicable with said outlet, said pump being provided on its discharge side with an attached communicable rigid pipe section having a manually controlled valve therein, an air compressor, an electric motor interposed between the air compressor and pump and having simultaneously operable axially aligned shafts one having driving connection with said pump and the other with said compressor, said shell constituting a common support for the pump, air compressor and motor, a compressed air delivery line communicatively connected at one end with the compressor and at its opposite end with an upper end portion of said rigid pipe section, a hose having a lower end connected with the upper end of said pipe section and an upper end detachably connected with an adjacent cooperating end of one of the pipe portions of said pipeline, and a second hose having an upper end connected detachably with the open end of the other pipe portion of said pipeline and having its lower end free and adapted to be communicatively associated for fluid return purposes with the fluid space of said sink.

References Cited in the file of this patent
UNITED STATES PATENTS

| | | |
|---|---|---|
| 1,724,639 | Burch | Aug. 13, 1929 |
| 2,025,592 | Kelly | Dec. 24, 1935 |
| 2,081,636 | Minors | May 25, 1937 |
| 2,680,445 | Hemminger | June 8, 1954 |
| 2,800,134 | Merritt | July 23, 1957 |
| 2,915,073 | Merritt | Dec. 1, 1959 |
| 2,997,049 | Thomas | Aug. 22, 1961 |
| 3,016,877 | Sparr | Jan. 16, 1962 |
| 3,067,756 | Bruggink | Dec. 11, 1962 |